US009594948B2

(12) United States Patent
Gouda et al.

(10) Patent No.: US 9,594,948 B2
(45) Date of Patent: Mar. 14, 2017

(54) MAKEUP SUPPORTING DEVICE, MAKEUP SUPPORTING METHOD, AND NON-TRANSITORY COMPUTER-READABLE RECORDING MEDIUM

(71) Applicant: Panasonic Intellectual Property Management Co., Ltd., Osaka (JP)

(72) Inventors: Youichi Gouda, Ishikawa (JP); Tomofumi Yamanashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/711,792

(22) Filed: May 14, 2015

(65) Prior Publication Data
US 2015/0248581 A1 Sep. 3, 2015

Related U.S. Application Data

(63) Continuation of application No. PCT/JP2014/004218, filed on Aug. 19, 2014.

(30) Foreign Application Priority Data

Aug. 30, 2013 (JP) ................................ 2013-179667

(51) Int. Cl.
*G06K 9/00* (2006.01)
*A45D 44/00* (2006.01)
*G06T 19/00* (2011.01)

(52) U.S. Cl.
CPC ....... *G06K 9/00281* (2013.01); *A45D 44/005* (2013.01); *G06T 19/006* (2013.01);
(Continued)

(58) Field of Classification Search
None
See application file for complete search history.

(56) References Cited

U.S. PATENT DOCUMENTS

2002/0024528 A1* 2/2002 Lambertsen ......... A45D 44/005
345/646
2007/0189627 A1* 8/2007 Cohen ................ G06K 9/00228
382/254
(Continued)

FOREIGN PATENT DOCUMENTS

JP 2001-346627 12/2001
JP 2003-044837 2/2003
(Continued)

OTHER PUBLICATIONS

International Search Report of PCT application No. PCT/JP2014/004218 dated Nov. 25, 2014.
(Continued)

*Primary Examiner* — Hilina K Demeter
(74) *Attorney, Agent, or Firm* — Greenblum & Bernstein, P.L.C.

(57) ABSTRACT

A makeup supporting device includes: a position acquisition unit that acquires a relative position of a predetermined indicator to a face; a contact determination unit that determines whether or not the indicator is in contact with the face; a makeup decision unit that decides a way of makeup to be applied to a facial image obtained by photographing the face, based on a contact position which is the relative position when the indicator is determined to be in contact with the face; and a makeup presentation unit that generates a simulation image by superimposing a makeup image on the facial image, the makeup image indicating a state of the makeup when the decided makeup is applied.

9 Claims, 10 Drawing Sheets

(52) U.S. Cl.
CPC ............... *G06T 2207/10004* (2013.01); *G06T 2207/30201* (2013.01)

(56) References Cited

U.S. PATENT DOCUMENTS

| | | | |
|---|---|---|---|
| 2007/0201724 A1* | 8/2007 | Steinberg | G06K 9/00228 382/103 |
| 2010/0142755 A1* | 6/2010 | Brandewie | G06Q 30/02 382/100 |
| 2012/0044335 A1* | 2/2012 | Goto | A45D 44/005 348/77 |
| 2012/0212440 A1 | 8/2012 | Nishida et al. | |
| 2013/0169827 A1* | 7/2013 | Santos | H04N 5/23229 348/207.1 |
| 2014/0016823 A1* | 1/2014 | Ye | G06T 19/20 382/103 |
| 2014/0328509 A1* | 11/2014 | Guissin | G06T 5/002 382/100 |
| 2016/0042224 A1* | 2/2016 | Liu | G06K 9/00248 382/203 |
| 2016/0125624 A1* | 5/2016 | Liu | G06K 9/00281 345/593 |

FOREIGN PATENT DOCUMENTS

| | | |
|---|---|---|
| JP | 2007-175384 | 7/2007 |
| JP | 2007-257165 | 10/2007 |
| KR | 20130000251 | 1/2013 |
| WO | 2011/048840 | 4/2011 |

OTHER PUBLICATIONS

Tatsuaki Hashimoto, et al. "Fingertip Detection Through the Use of a Webcam" Journal of JACT, vol. 17, No. 3 (2012).

Naoki Sugita, et al. "Recognizing Finger Contact onto Table by Processing of Nail Images" SICE, pp. 13-18, 2007.

The Extended European Search Report dated Aug. 12, 2016 for the related European Patent Application No. 14841275.2.

Camelia Florea et al: "Eye color classification for makeup improvement", Computer Science and Information Systems (FEDCSIS), 2012 Federated Conference on, IEEE, Sep. 9, 2012 (Sep. 9, 2012), pp. 55-62, XP032267185.

* cited by examiner

| CONTACT POSITION RANGE | MAKEUP TYPE | COLOR | DENSITY | AREA |
|---|---|---|---|---|
| P1 | T1 | C1 | D1 | A1 |
| P2 | T1 | C2 | D2 | A2 |
| P3 | T1 | C3 | D3 | A3 |
| ⋮ | ⋮ | ⋮ | ⋮ | ⋮ |

431  432  433  434  435

MAKEUP SUPPORTING DEVICE, MAKEUP SUPPORTING METHOD, AND NON-TRANSITORY COMPUTER-READABLE RECORDING MEDIUM

BACKGROUND

1. Field of the Invention

The present disclosure relates to a makeup supporting device, a makeup supporting method, and a non-transitory computer-readable recording medium for supporting facial makeup.

2. Description of the Related Art

Nowadays, a way of facial makeup (hereinafter, simply referred to as "makeup") is diversifying. It is difficult, particularly for a person who has insufficient knowledge about the makeup, to select proper makeup from countless options. This is because it takes an enormous amount of time and effort to actually try every makeup to determine and compare the makeup.

In view of the above, for example, PTLs 1 and 2 disclose technologies for generating and presenting a simulation image of a face when the makeup is applied. In the technologies of PTLs 1 and 2, there is acquired an image obtained by photographing a face of a makeup target (hereinafter, simply referred to as a "face") (hereinafter, such an image is referred to as a "facial image"). In the technologies of PTLs 1 and 2, an image indicating a state in which the makeup is applied to the face (hereinafter, referred to as a "makeup image") is superimposed on the facial image to generate a simulation image and display the generated simulation image. Hereinafter, the generation and display of the simulation image is referred to as a "makeup simulation".

According to the technologies of PTLs 1 and 2, suitability of the makeup can be determined without actually applying the makeup. That is, the proper makeup can be selected with less time and effort.

Meanwhile, sometimes a user wants to simulate not only a makeup result but also makeup work.

In view of the above, for example, it is conceivable that the simulation image is generated using the technology of PTL 3. In the technology of PTL 3, a contact region is detected when a finger or an input tool such as a pen comes into contact with a display screen. Use of the technology of PTL 3 can designate a makeup region in the displayed facial image, and simulate the makeup work.

CITATION LIST

Patent Literatures

PTL 1: Unexamined Japanese Patent Publication No. 2001-346627
PTL 2: Unexamined Japanese Patent Publication No. 2007-175384
PTL 3: International Patent Publication No. 2011/048840
PTL 4: Unexamined Japanese Patent Publication No. 2003-44837

Non-Patent Literature

NPL 1: Tatsuaki Hashimoto, Noriaki Katayama, Toshitaka Umemoto, "Fingertip detection through the use of a Webcam", Journal of JACT, Vol. 17, No. 3, 2012, pp. 13-16

NPL 2: Naoki Sugita, Goshirou Yamamoto, Shinsaku Hiura, "Fingertip contact determination using nail image", Material on Pattern Measurement Symposium, Vol. 12, 2007, pp. 13-18

However, even if the technologies of PTLs 1 and 2 are combined with the technology of PTL 3, it is difficult to give the user a feeling of actually performing the makeup work on the face. This is because a work feeling for the facial image displayed on a display screen differs largely from a work feeling for the actual face.

SUMMARY OF THE INVENTION

One non-limiting and exemplary embodiment provides a makeup supporting device, a makeup supporting method, and a non-transitory computer-readable recording medium for being able to obtain the feeling of actually performing the makeup work on the face.

In one general aspect, the techniques disclosed here feature a makeup supporting device includes: a position acquisition unit that acquires a relative position of a predetermined indicator to a face; a contact determination unit that determines whether or not the indicator is in contact with the face; a makeup decision unit that decides a way of makeup to be applied to a facial image obtained by photographing the face, based on a contact position which is the relative position when the indicator is determined to be in contact with the face; and a makeup presentation unit that generates a simulation image by superimposing a makeup image on the facial image, the makeup image indicating a state of the makeup when the decided makeup is applied.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium a, or any selective combination thereof.

BRIEF DESCRIPTION OF DRAWINGS

FIG. 5 is a view illustrating an example of contents of a makeup table according to the second exemplary embodiment;

DETAILED DESCRIPTION

Exemplary embodiments of the present invention will be described in detail below with reference to the drawings.

First Exemplary Embodiment

A first exemplary embodiment of the present disclosure is an example of a basic mode of the present invention.

Figure 1:
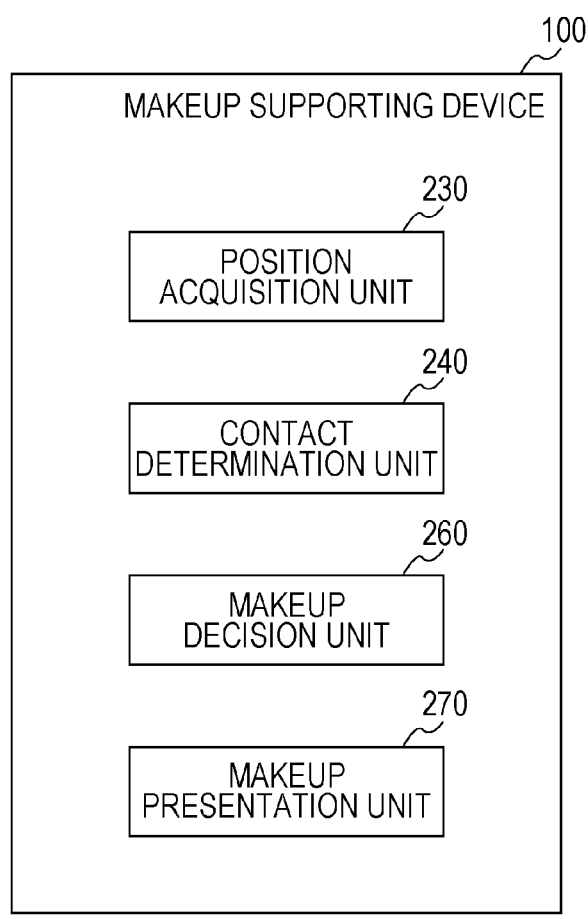
FIG. 1 is a block diagram illustrating an example of a configuration of a makeup supporting device according to a first exemplary embodiment of the present disclosure.

FIG. 1 is a block diagram illustrating an example of a configuration of the makeup supporting device according to the first exemplary embodiment.

Referring to FIG. 1, makeup supporting device 100 includes position acquisition unit 230, contact determination unit 240, makeup decision unit 260, and makeup presentation unit 270.

Position acquisition unit 230 acquires a relative position of a predetermined indicator to a face. For example, the predetermined indicator is a user's fingertip.

Contact determination unit 240 determines whether or not the indicator is in contact with the face.

Based on a contact position that is the relative position when the indicator is determined to be in contact with the face, makeup decision unit 260 decides a way of makeup to be applied to a facial image obtained by photographing the face.

Makeup presentation unit 270 generates the simulation image by superimposing, on the facial image, the makeup image indicating the makeup state in which the decided makeup is applied.

Although not illustrated, for example, makeup supporting device 100 includes a CPU (Central Processing Unit), a storage medium such as a ROM (Read Only Memory) in which a control program is stored, and a working memory such as a RAM (Random Access Memory). In this case, the CPU executes the control program to implement a function of each of the above units.

In makeup supporting device 100, the makeup of a makeup simulation target can be decided by bringing the indicator such as the fingertip into contact with the face. That is, with the makeup supporting device 100, it is possible to give the user the feeling of actually performing the makeup work on the face.

Second Exemplary Embodiment

A second exemplary embodiment of the present disclosure is an example of a specific mode of the present invention. The second exemplary embodiment is an example in which the present invention is applied to a device including a digital video camera and a touch-panel-equipped display.

<Description of Terms>

Terms used in the second exemplary embodiment will now be described.

"Facial components" mean parts constituting the face such as an eye, an eyebrow, a nose, a cheekbone, a lip, and a contour.

"Facial feature points" mean feature points of the facial components such as an inner end of an eyebrow, an outer end of the eyebrow, an inner corner of an eye, and an outer corner of the eye on an image or a real space.

"Makeup" means makeup ways (kinds), such as eyebrow-paint and eye shadow, which correct an impression of a feature of the facial components to enhance appearance, and the makeup includes at least a dye color, a makeup density, and an application area.

"Makeup information" means information indicating details of the makeup, and includes at least information (information indicating a difference from a facial color) necessary for the generation of the image, in which the makeup is applied to the face, from the facial image.

"Makeup types" mean makeup kinds including "foundation", "eyebrow-paint", "eye shadow", "lipstick", and "cheek makeup", which are distinguished by a positional relationship with at least the facial components.

A "makeup image" means an image illustrating a makeup state in which the makeup is applied to the face.

<Configuration of Makeup Supporting Device>

A configuration of the makeup supporting device according to the second exemplary embodiment will be described below.

Figure 2:
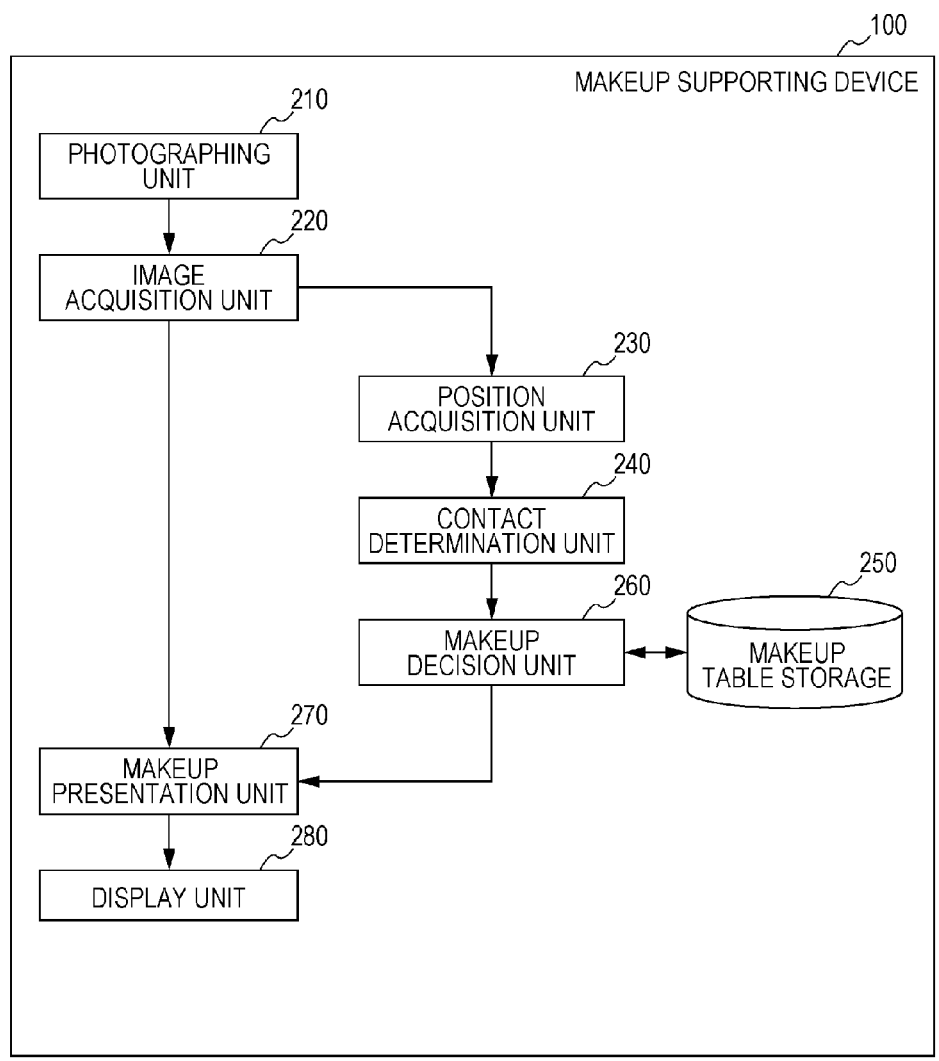
FIG. 2 is a block diagram illustrating an example of a configuration of a makeup supporting device according to a second exemplary embodiment of the present disclosure.

FIG. 2 is a block diagram illustrating an example of the configuration of the makeup supporting device according to the second exemplary embodiment.

Referring to FIG. 2, makeup supporting device 100 includes photographing unit 210, image acquisition unit 220, position acquisition unit 230, contact determination unit 240, makeup table storage 250, makeup decision unit 260, makeup presentation unit 270, and display unit 280.

An example of photographing unit 210 includes a digital video camera, and photographing unit 210 photographs a video image of the face becoming a makeup simulation target. Photographing unit 210 then outputs the photographed video image to image acquisition unit 220. The video image includes a plurality of time-series images (frame images). In the second exemplary embodiment, it is assumed that the face becoming the makeup simulation target is a face of a user using makeup supporting device 100.

Image acquisition unit 220 sequentially acquires the images constituting the video image from the input video image. Image acquisition unit 220 then outputs the acquired image (hereinafter, referred to as a "photographed image") to position acquisition unit 230 and makeup presentation unit 270. Herein, image acquisition unit 220 desirably performs image processing of mirror-reversing the photographed image in order to give the user a feeling of applying the makeup while looking into a mirror. In addition, the photographed image includes a part of the image of the face becoming the makeup simulation target (hereinafter, referred to as a "facial image").

Position acquisition unit 230 acquires a relative position of a predetermined indicator to a face. In the second exemplary embodiment, it is assumed that the predetermined indicator is the user's fingertip.

More specifically, position acquisition unit 230 acquires the facial feature points of each facial component and a region of the fingertip (hereinafter, referred to as a "fingertip region") in the photographed image from the input photographed image.

For example, the facial feature points are acquired by matching of each partial region of the facial image with a template of each of previously-prepared facial components in which the positions of the facial feature points are set (for example, see PTL 4).

Position acquisition unit 230 also acquires the relative position of the fingertip to the face (hereinafter, referred to as a "fingertip relative position") from the position of the acquired facial feature points and the position of the acquired fingertip region. Position acquisition unit 230 then outputs, to contact determination unit, the input photographed image, information indicating identification information and the position of the acquired facial feature points (hereinafter, referred to as "facial feature point information"), and the acquired fingertip region and fingertip relative position. The facial feature points, the fingertip region acquisition technique, and the fingertip relative position are described in detail later.

Contact determination unit 240 determines whether or not the fingertip is in contact with the face (hereinafter, referred to as a "fingertip contact determination"). Contact determination unit 240 then outputs, to makeup decision unit 260, the input facial feature point information, the input fingertip relative position, and information indicating a determination result (hereinafter, referred to as a "contact determination information"). The fingertip contact determination technique is described in detail later.

Makeup table storage 250 previously stores a makeup table. In the makeup table, a fingertip relative position when the fingertip is determined to be in contact with the face (hereinafter, referred to as a "contact position") is correlated with a makeup type, a makeup color, a makeup density, and a makeup application area. The makeup table is described in detail later.

Makeup decision unit 260 acquires, as the contact position, the fingertip relative position of the contact determination information indicating that the fingertip is in contact with the face. Based on the acquired contact position, makeup decision unit 260 decides the makeup to be applied to the facial image.

More specifically, makeup decision unit 260 refers to the makeup table to decide the makeup type, the makeup color, the makeup density, and the makeup application area, based on the contact position. Then, makeup decision unit 260 generates the makeup information indicating details of the decided makeup, and outputs the generated makeup information to makeup presentation unit 270. In the second exemplary embodiment, the makeup information includes at least information indicating the color, density, and region of the makeup image with respect to facial image.

Makeup presentation unit 270 generates the image of the decided makeup from the input makeup information. Makeup presentation unit 270 generates the simulation image by superimposing the generated makeup image on the facial image included in the input photographed image. Makeup presentation unit 270 then outputs the generated simulation image for the makeup to display unit 280.

Note that, while the makeup is not yet decided, makeup presentation unit 270 outputs not the simulation image but the photographed image to display unit 280. Moreover, makeup presentation unit 270 holds the decided makeup relative position, makeup color, and makeup density in a series of video images. The makeup image superimposition technique is described in detail later.

For example, display unit 280 includes a display part of the touch-panel-equipped display. Display unit 280 displays the simulation image based on image data of the input simulation image. More specifically, display unit 280 sequentially displays the simulation image along the photographed video image.

Although not illustrated, for example, makeup supporting device 100 includes a CPU, a storage medium such as a ROM in which the control program is stored, and a working memory such as a RAM. In this case, the CPU executes the control program to implement a function of each of the above units.

In makeup supporting device 100, the makeup of the makeup simulation target can be decided by bringing the fingertip into contact with the face.

The facial feature points, the fingertip region acquisition technique, the fingertip relative position, the fingertip contact determination technique, and the makeup table will sequentially be described in detail below.

<Facial Feature Points>

Figure 3:
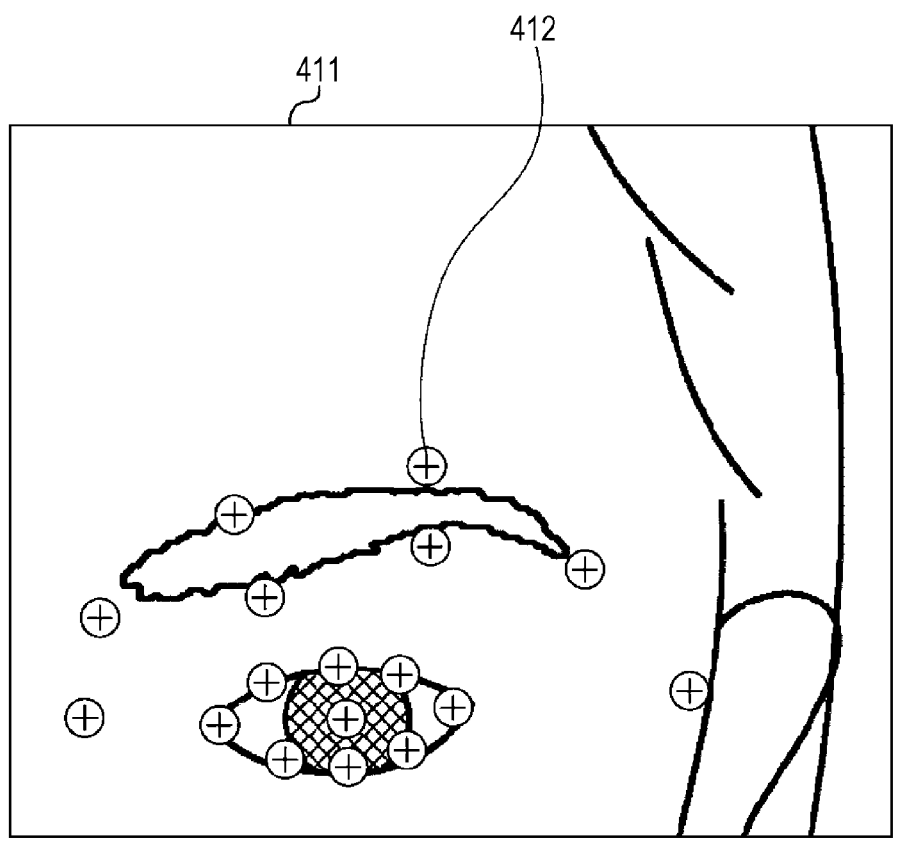
FIG. 3 is a view illustrating an example of facial feature points according to the second exemplary embodiment.

FIG. 3 is a view illustrating an example of the facial feature points extracted from the facial image.

As illustrated in FIG. 3, a plurality of facial feature points 412 (in FIG. 3, indicated by marks with a circle having a cross therein) are extracted from facial image (only a part is illustrated) 411 in each facial component, for example. Facial feature points 412 are mainly located in an edge, an acute portion, a central portion, and the like of the facial component. The arrangement of facial feature points 412 depends on the face.

The extraction of facial feature points 412 can extract each facial component from the photographed image, and set a facial coordinate system (to be described later).

<Fingertip Region Acquisition Technique>

For example, position acquisition unit 230 acquires the fingertip region from the photographed image using the technology of NPL 1. In the following description, a "skin color" means a color of a skin of a person (such as a user). That is, a skin color region means a region having a color similar to the color of the user's skin.

Position acquisition unit 230 extracts the skin color region from the photographed image. Then, position acquisition unit 230 estimates a finger region from an edge shape in the skin color region, and estimates the fingertip region from the estimated finger region.

More specifically, position acquisition unit 230 sequentially scans contour points in the skin color region to define two vectors connecting an interest contour point and other two contour points that are separated back and forth by several elements from the interest contour point. Position acquisition unit 230 determines whether or not conditions are satisfied in which an angle formed by the two vectors falls within a predetermined range and a line symmetry position with respect to the lines connecting the interest contour point and the two contour points is included in the skin color region.

When the conditions are satisfied, position acquisition unit 230 determines that the interest contour point constitutes the edge of the fingertip. Then, position acquisition unit 230 decides the fingertip region based on the contour point determined to be the constitution of the edge of the fingertip. For example, position acquisition unit 230 determines that a region is the fingertip region, the region being surrounded by a circle or an ellipse passing through a plurality of points determined to be the constitution of the edge of the fingertip.

The fingertip region can easily be acquired using the technique.

<Fingertip Relative Position>

For example, position acquisition unit 230 acquires a center position of the fingertip region as the fingertip position in the photographed image. For example, position acquisition unit 230 then converts the acquired fingertip position into a coordinate value in a coordinate system that is defined based on the face (hereinafter, referred to as a "facial coordinate system"). That is, position acquisition unit 230 maps the fingertip position in the photographed image on the facial coordinate system. That is, the fingertip position in the facial coordinate system is the fingertip relative position.

Figure 4:
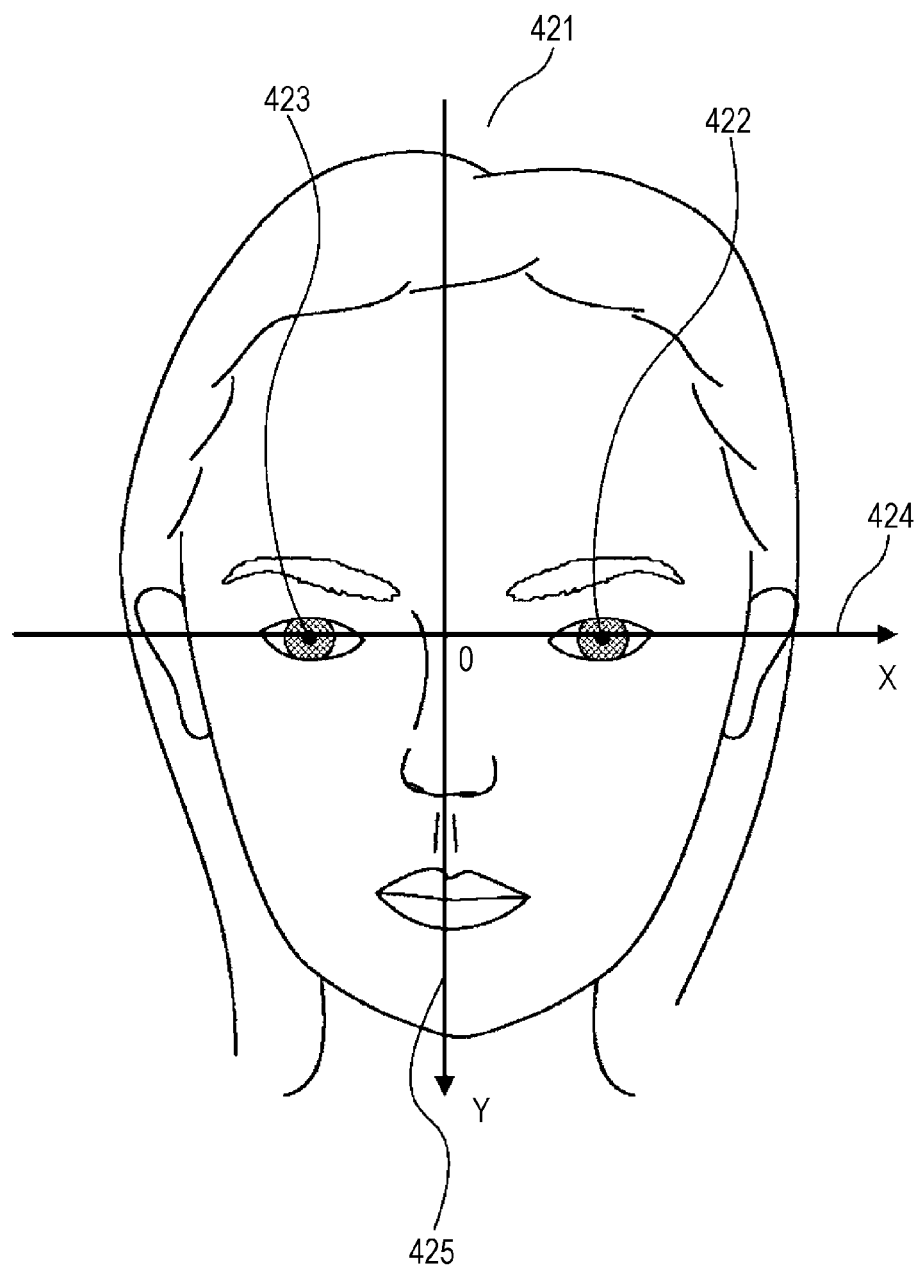
FIG. 4 is a view illustrating an example of a facial coordinate system according to the second exemplary embodiment.

FIG. 4 is a view illustrating an example of the face coordinate system.

As illustrated in FIG. 4, for example, facial coordinate system 421 is a coordinate system in which an X-axis is set to axis 424 passing through center 422 of a left eye and center 423 of a right eye, and a Y-axis is set to axis 425, which is orthogonal to the X-axis and passes through a center point between center 422 of the left eye and center 423 of the right eye. Note that, desirably a unit length of facial coordinate system 421 is a length that is proportional to a distance between the plurality of facial feature points, such as a length based on a distance between center 422 of the left eye and center 423 of the right eye.

Note that, the facial coordinate system is not limited to the example illustrated in FIG. 4. For example, the facial coordinate system may be defined by an axis passing through a tip of a nose and the outer corner of the right eye and an axis passing through the tip of the nose and the outer corner of the left eye.

A determination which one of parts of the face the user wants to apply the makeup can be determined by the acquisition of the fingertip relative position.

<Fingertip Contact Determination Technique>

For example, contact determination unit 240 makes the fingertip contact determination based on the facial image and the fingertip region using, for example, the technology of NPL 2.

That is, contact determination unit 240 repeatedly acquires a color pattern (that is, a color pattern of the fingertip region) of the fingertip in the photographed image in a short period of time. Contact determination unit 240 determines whether or not the color pattern in the fingertip region changes, and determines whether or not the fingertip is in contact with the face based on the change in color pattern. For example, the determination may be made based on which a previously-prepared color pattern during non-contact or a previously-prepared color pattern during contact is similar to the color pattern of the fingertip region, or the determination may be made based on a direction of the change in color pattern.

Whether or not the fingertip is in contact with the face can easily be determined using the technique.

<Makeup Table>

FIG. 5 is a view illustrating an example of contents of a makeup table stored in makeup information storage 250.

As illustrated in FIG. 5, for example, makeup type 432, color 433, density 434, and area 435 are stored in makeup table 430 in correlation with contact position range 431.

Contact position range 431 is one that is defined based on the facial feature points or the facial coordinate system. For example, contact position range 431 is a range where a region connecting the plurality of facial feature points located on the contour of the eyebrow is expanded by a predetermined width (hereinafter, referred to as an "eyebrow peripheral region").

Although simplified in FIG. 5, specifically makeup type 432 includes "eyebrow-paint", "foundation", "eye shadow", "lipstick", "cheek makeup", and the like. For example, makeup type 432 corresponding to contact position range 431 indicating the eyebrow peripheral region is the "eyebrow-paint".

Although simplified in FIG. 5, specifically color 433 includes an RGB value, glossiness, and the like. For example, color 433 corresponding to contact position range 431 indicating the eyebrow peripheral region is "dark brown".

Although simplified in FIG. 5, specifically density 434 includes permeability during the superimposition on the facial image, a gradation method, and the like. For example, density 434 corresponding to contact position range 431 indicating the eyebrow peripheral region is "70%".

Although simplified in FIG. 5, specifically area 435 is a relatively small area including the contact position. For example, area 435 corresponding to contact position range 431 indicating the eyebrow peripheral region is an "inside of a circle having a diameter of 3 mm around the contact position". Area 435 corresponds to a thickness of a writing pen or a stick, which is actually used in the makeup. In this case, a stippled makeup portion having the diameter of 3 mm corresponds to one contact position.

The use of makeup table 430 can properly determine the makeup type of the makeup work target of the user based on the contact position. The proper makeup color, the proper makeup density, and the proper makeup application area based on the contact position can be decided according to the makeup type.

<Makeup Image Superimposition Technique>

Makeup presentation unit 270 generates a makeup image based on the makeup information. For example, the makeup image is generated in such a manner that the stippled makeup image indicated by the makeup information at each time is combined with the makeup image generated with respect to the identical makeup type until the generation of the makeup image. Therefore, makeup presentation unit 270 can expand the makeup application region along a trace of the fingertip according to movement of the fingertip. That is, a process similar to a process of applying the makeup in the actual makeup work can be performed in the generation of the makeup image.

For example, makeup presentation unit 270 superimposes the makeup image on the facial image using well-known image combination processing such as alpha (α) blend processing. In this case, the a value is set to a value corresponding to the makeup density. For example, the alpha blend processing is expressed by the following equations (1) to (3). Where, r1, g1, and b1 are RGB values in any region of the facial image. Where, r2, g2, and b2 are RGB values in any region of the makeup image. Here, R, G, and B are RGB values in the corresponding region of the simulation image.

$$R = r2 \times \alpha + r1 \times (1-\alpha) \quad (1)$$

$$G = g2 \times \alpha + g1 \times (1-\alpha) \quad (2)$$

$$B = b2 \times \alpha + b1 \times (1-\alpha) \quad (3)$$

A more natural makeup simulation image can be obtained using these techniques.

<Operation of Makeup Supporting Device>

Operation of makeup supporting device 100 will be described below.

Figure 6:
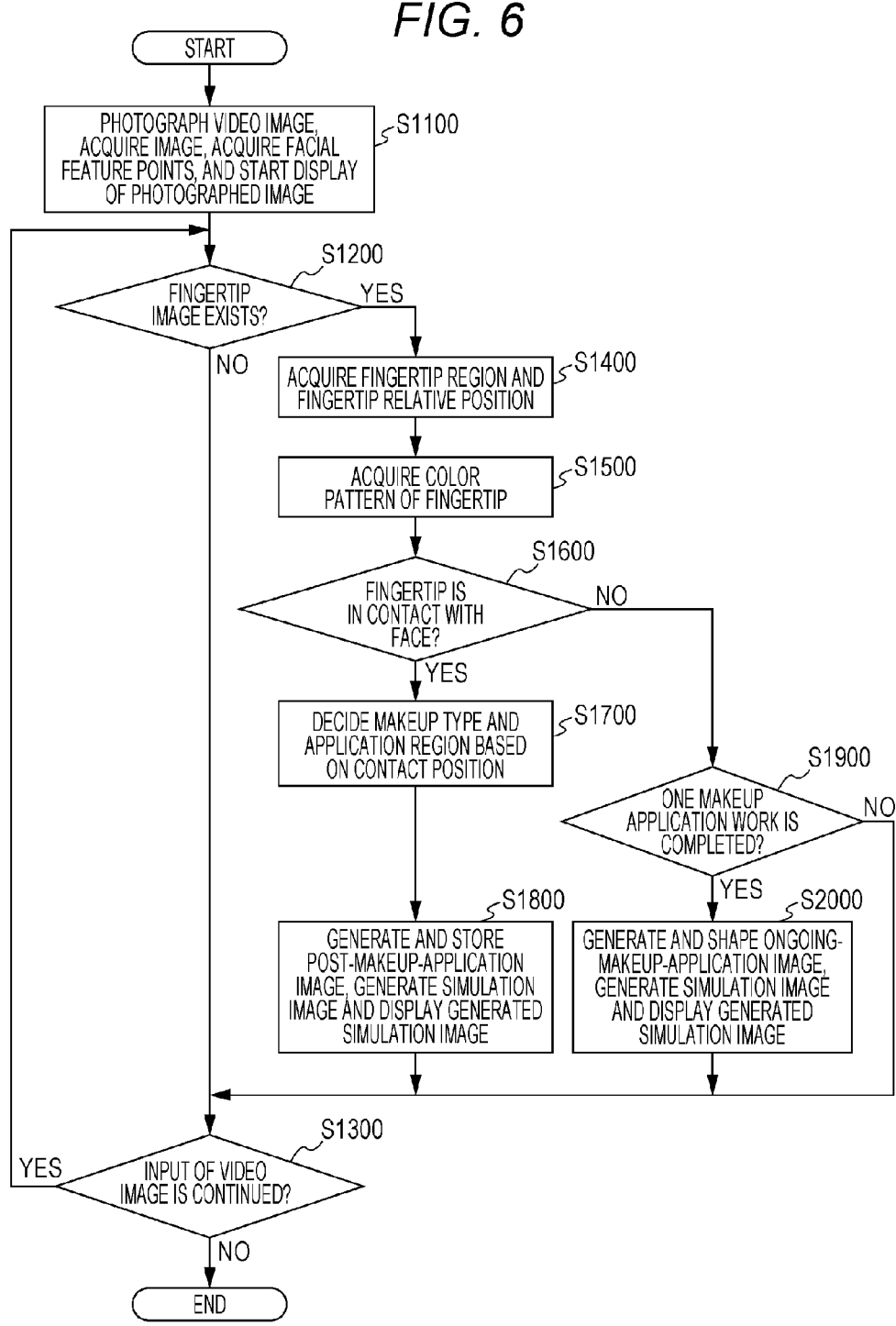
FIG. 6 is a flowchart illustrating an example of operation in the makeup supporting device according to the second exemplary embodiment.

FIG. 6 is a flowchart illustrating an example of the operation of makeup supporting device 100.

In step S1100, photographing unit 210 starts the photographing of the video image of the user's face, and image acquisition unit 220 starts the acquisition of the photographed image. Position acquisition unit 230 starts the acquisition of the facial feature points from the photographed image, and makeup presentation unit 270 starts transfer of the photographed image to display unit 280 (that is, the display of the photographed image on display unit 280).

Figure 7:
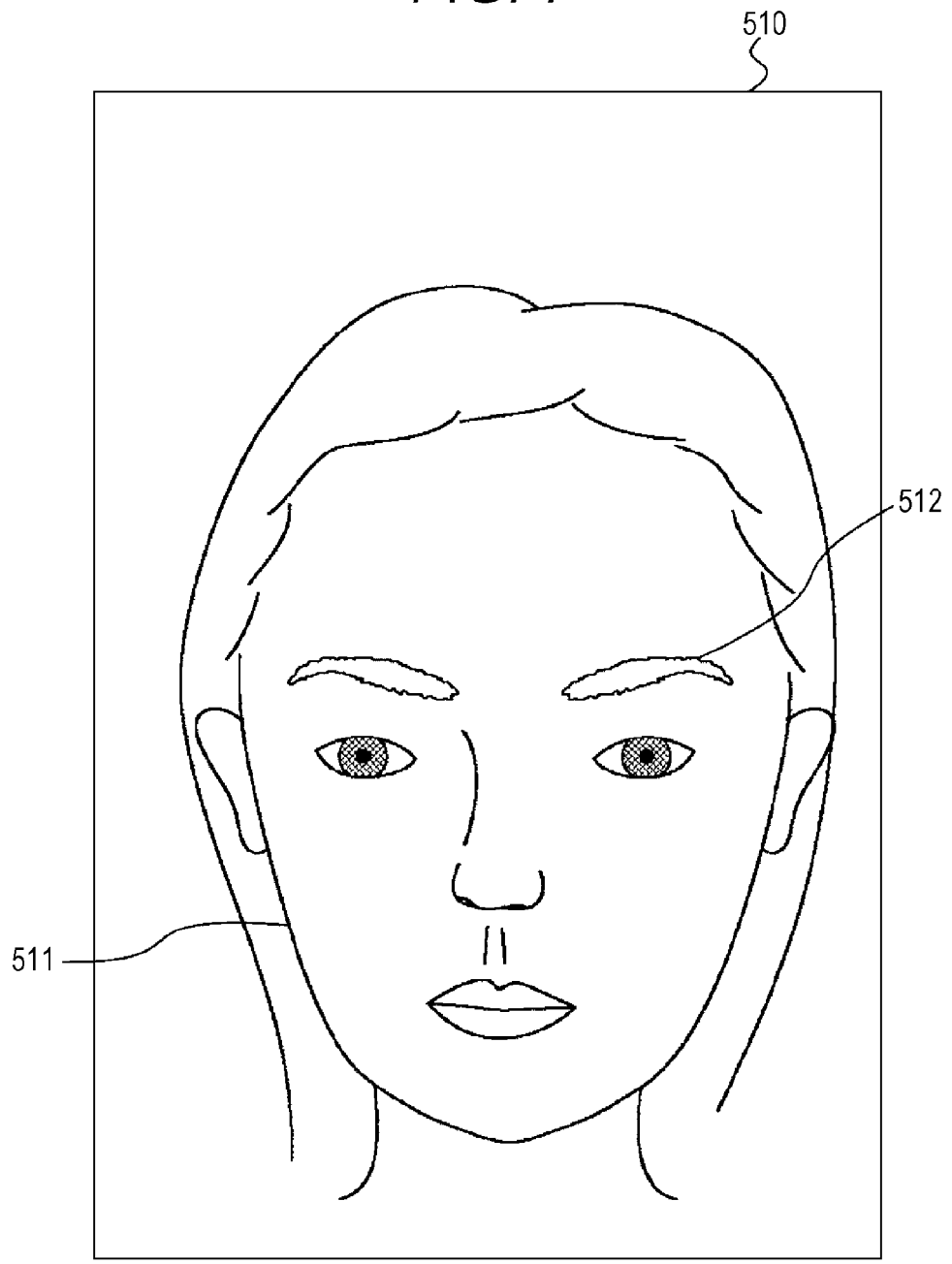
FIG. 7 is a view illustrating an example of a photographed image before a fingertip comes into contact with a face according to the second exemplary embodiment.

FIG. 7 is a view illustrating an example of the photographed image before the fingertip comes into contact with the face.

As illustrated in FIG. 7, photographed image 510 includes facial image 511. At this point, the user does not apply the makeup. For example, the facial feature points illustrated in FIG. 3 are extracted from photographed image 510 to generate the information on the facial feature points.

In step S1200, position acquisition unit 230 determines whether or not a fingertip image (fingertip region) is included in the photographed image. If the fingertip image is not included in the photographed image (NO in S1200), position acquisition unit 230 moves the processing to step S1300. If the fingertip image is included in the photographed image (YES in S1200), position acquisition unit 230 moves the processing to step S1400.

In step S1300, image acquisition unit 220 determines whether or not the input of the video image is continued. If the input of the video image is continued (YES in S1300), image acquisition unit 220 returns the processing to step S1400 to switch the processing to the next photographed image.

In step S1400, position acquisition unit 230 acquires the fingertip region and the fingertip relative position.

Figure 8:
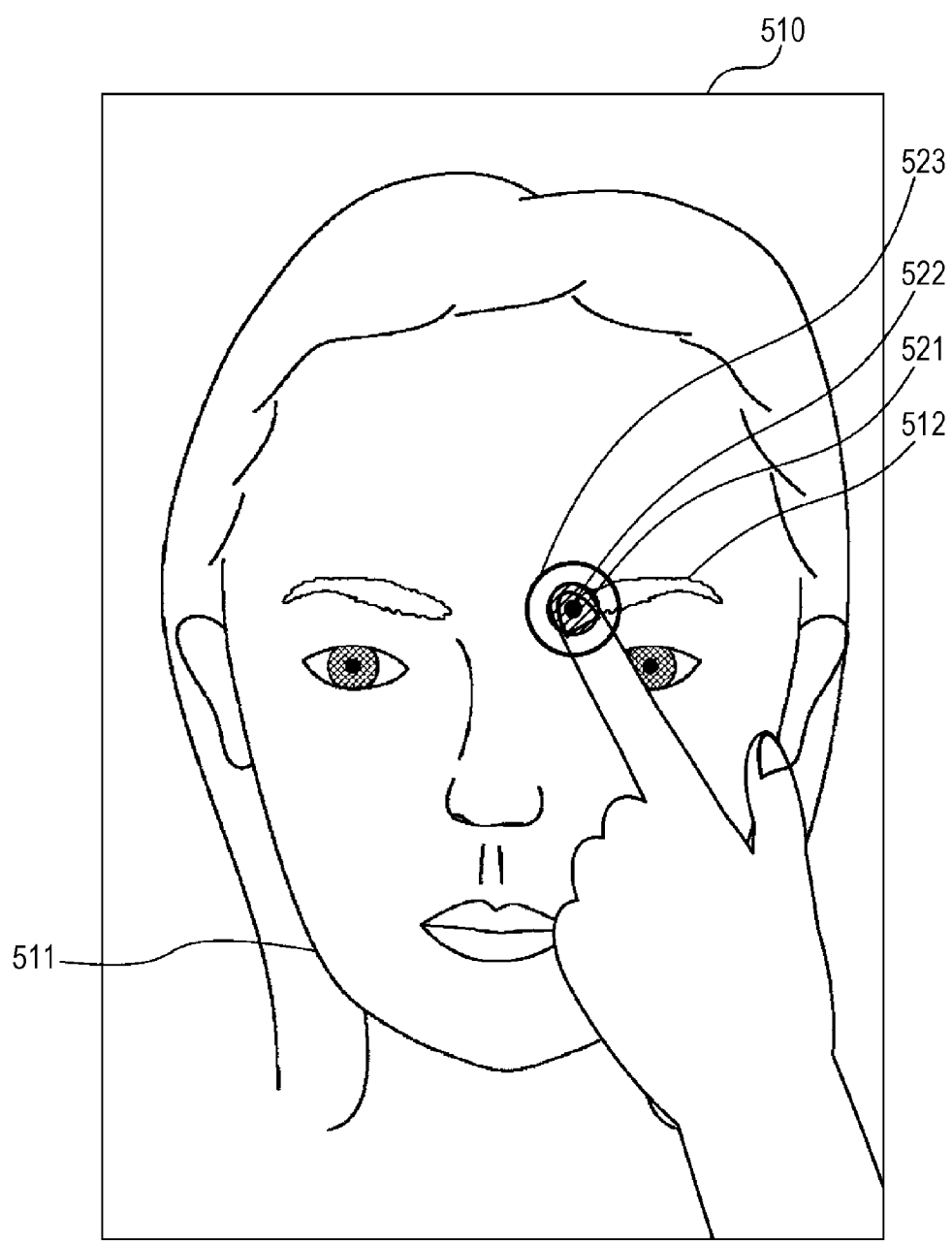
FIG. 8 is a view illustrating an example of a simulation image when the contact is started according to the second exemplary embodiment.

FIG. 8 is a view illustrating an example of the simulation image when the contact is started. FIG. 8 illustrates the example when the user attempts to pass a user's forefinger across the left eyebrow.

As illustrated in FIG. 8, it is assumed that the user brings the user's fingertip into contact with the inner end of left eyebrow 512 in order to perform the makeup simulation on the eyebrow-paint of left eyebrow 512. In this case, position acquisition unit 230 acquires fingertip region 521 and fingertip relative position 522 from facial image 511.

Herein, while the fingertip is in contact with the face, desirably makeup presentation unit 270 also displays a marker indicating the contact position. The marker may be ring graphic 523 illustrated in FIG. 8 or other graphics such as a dotted graphic. The marker may blink.

In step S1500 of FIG. 6, contact determination unit 240 acquires the color pattern of the fingertip from facial image 511, and records the acquired color pattern in a memory of makeup supporting device 100. As a result, time-series data of the color pattern of the fingertip is accumulated in makeup supporting device 100.

In step S1600, contact determination unit 240 determines whether or not the fingertip is in contact with the face based on the accumulated time-series data of the color pattern of the fingertip. If the fingertip is in contact with the face (YES in S1600), contact determination unit 240 moves the processing to step S1700.

In step S1700, makeup decision unit 260 refers to makeup table 430 (see FIG. 5) to decide the makeup type and the makeup application region based on the contact position. As described above, the image corresponding to the decided makeup is, for example, the stippled makeup image.

Then, in step S1800, makeup presentation unit 270 generates a makeup image until the fingertip is separated from the face since the fingertip comes into contact with the face (hereinafter, referred to as an "ongoing-makeup-application image"). Makeup presentation unit 270 superimposes the generated ongoing-makeup-application image on the facial image to generate the simulation image under the makeup work. Makeup presentation unit 270 moves the processing to step S1300.

At this point, makeup presentation unit 270 generates the new ongoing-makeup-application image by combining the newly-generated makeup image with the ongoing-makeup-application images continuously generated in the past times. Therefore, every time the ongoing-makeup-application image is generated, makeup presentation unit 270 stores the color, density, and area of the ongoing-makeup-application image in the memory of makeup supporting device 100. For example, the range of the stored image is defined by the coordinate value of the facial coordinate system. That is, makeup supporting device 100 stores the ongoing-makeup-application image together with the relative position to the face.

Figure 9:
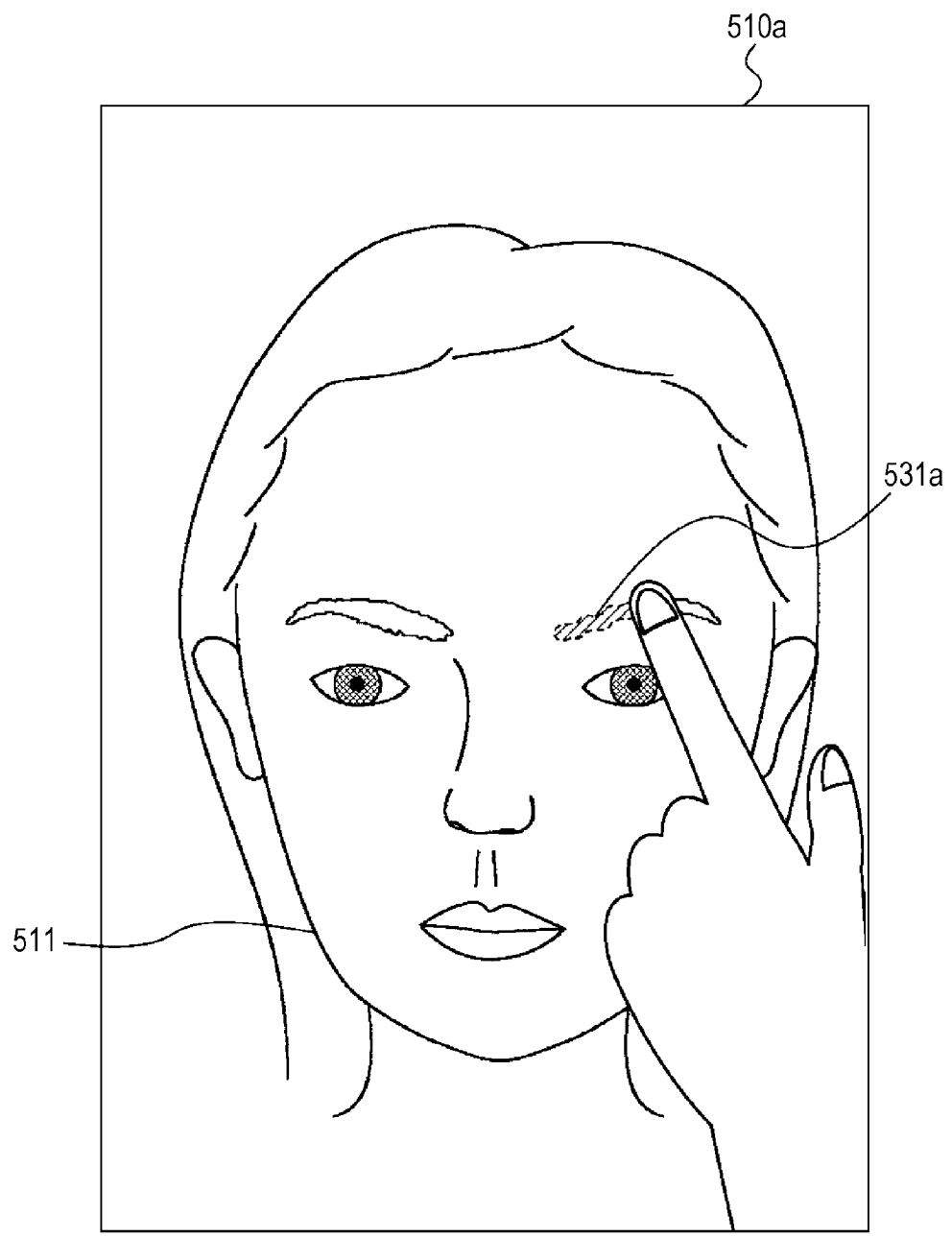
FIG. 9 is a view illustrating an example of the simulation image when the contact position moves according to the second exemplary embodiment.

FIG. 9 is a view illustrating an example of the simulation image when the contact position moves. FIG. 9 illustrates the example when the user passes the user's forefinger across the left eyebrow.

As illustrated in FIG. 9, in simulation image 510a, ongoing-eyebrow-paint-application image 531a of the left eyebrow is superimposed on facial image 511. In other words, image 531a is a logical addition of all the regions when the regions having the size defined with respect to the eyebrow-paint are arrayed on the trace of the fingertip position.

In the actual makeup, sometimes the eyebrow-paint is drawn into the shape or at the position different from that of the original eyebrow hairs after shaving off a whole or part of the eyebrow hairs. For this reason, desirably makeup presentation unit 270 also performs processing of erasing the eyebrow from the facial image in the case where the makeup image of the eyebrow-paint is generated.

For example, the processing of erasing the eyebrow is performed as follows. Makeup presentation unit 270 extracts a color in a portion between the eyebrows as the skin color based on the position of the facial feature points in the facial image. Makeup presentation unit 270 overwrites the range having a predetermined width around the eyebrow-paint application region (ongoing-eyebrow-paint-application image) in the extracted skin color. Note that, as to the eyebrow hair erasing technique, in addition to the above technique, there is a technique of extracting the eyebrow hair region to replace pixels in the eyebrow hair region with a pixel value in the surrounding non-eyebrow hair region.

Before an operation to apply the eyebrow-paint, makeup presentation unit 270 may receive an operation to fill the eyebrow hair region in the skin color in order to erase the eyebrow hairs. In this case, for example, the image of the makeup type selected by makeup decision unit 260 is combined with the image in which the eyebrow hairs are erased.

Meanwhile, when the makeup image is superimposed on the finger image, the image is unnatural. Accordingly, for example, makeup presentation unit 270 may temporarily turn a portion overlapping with the fingertip region in the makeup image a transparent color.

If the fingertip is not in contact with the face (NO in S1600), contact determination unit 240 moves the processing to step S1900. The processing proceeds to step S1900 before the user brings the user's fingertip into contact with the face, or after the user ends one application operation to separate the fingertip from the face.

In step S1900, makeup presentation unit 270 determines whether or not one application operation is completed. For example, the determination in step S1900 is made by determining whether or not the fingertip is in contact with the face immediately before the determination in step S1900. If one application operation is completed (YES in S1900), makeup presentation unit 270 moves the processing to step S2000. If one application operation is not completed (NO in S1900), makeup presentation unit 270 moves the processing to step S1300.

In step S2000, makeup presentation unit 270 generates a makeup image until the fingertip is separated from the face since the fingertip comes into contact with the face (hereinafter, referred to as a "post-makeup-application image"). Makeup presentation unit 270 superimposes the generated post-makeup-application image on the facial image to generate the simulation image, and display unit 280 displays the generated simulation image. Makeup presentation unit 270 moves the processing to step S1300.

In the case where the user passes the users' fingertip across the face, the trace may often become rough compared with the case where the user runs a makeup brush or a stick on a surface of the face. Even if the trace is actually smooth, an error is generated in detecting the position of the facial feature points or the contact position, whereby sometimes the trace is falsely detected as the rough trace.

Therefore, makeup presentation unit 270 shapes the generated post-makeup-application image in step S2000. More specifically, makeup presentation unit 270 smooths the edge shape of the post-makeup-application image, and blurs the edge portion such that the color changes smoothly in the edge portion.

Figure 10:
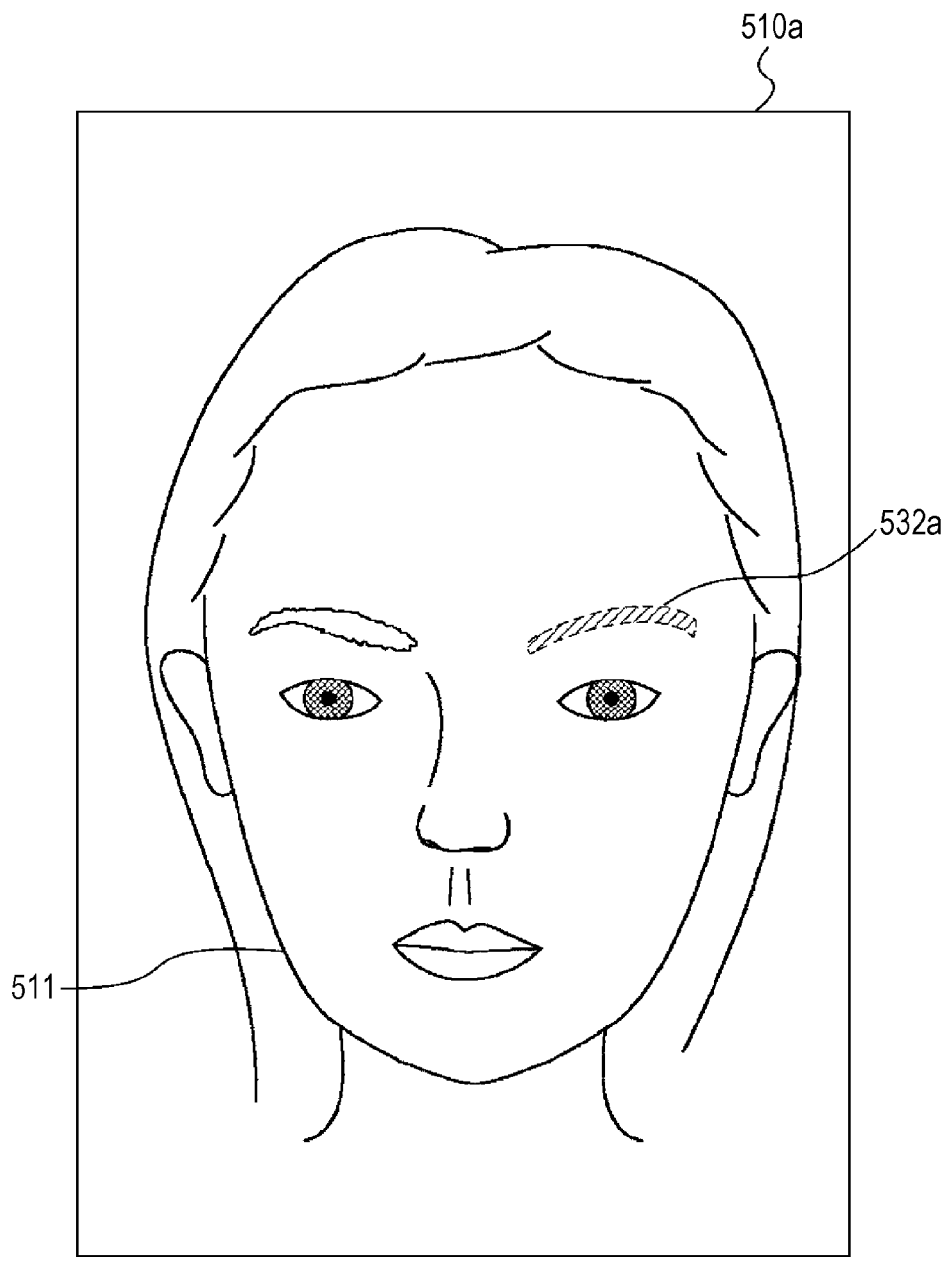
FIG. 10 is a view illustrating an example of the simulation image when an application operation is completed according to the second exemplary embodiment.

FIG. 10 is a view illustrating an example of the simulation image when the application operation is completed. FIG. 10 illustrates the example when the user ends to pass the user's forefinger across the left eyebrow.

As illustrated in FIG. 10, in simulation image 510a, post-makeup-application image 532a of the eyebrow-paint of the left eyebrow is superimposed on the facial image 511. The edge shape of post-makeup-application image 532a is smoothed. The edge of post-makeup-application image 532a is blurred. That is, simulation image 510a becomes the image displaying the state in which the beautiful, natural eyebrow-paint is applied.

Herein, every time the post-makeup-application image is generated, makeup presentation unit 270 stores the color, density, and area of the post-makeup-application image in the memory of makeup supporting device 100. For example, the range of the stored post-makeup-application image is defined by the coordinate value of the facial coordinate system. That is, makeup supporting device 100 stores the post-makeup-application image together with the relative position to the face.

If the input of the video image is ended (NO in S1300), image acquisition unit 220 ends a sequence of pieces of processing.

Through the processing, makeup supporting device 100 can apply the makeup to the facial image according to the operation to pass the user's fingertip across the face. Makeup supporting device 100 can store the ongoing-makeup-application image and the post-makeup-application image together with the relative position to the face. Accordingly, makeup supporting device 100 can continue the makeup simulation even if the position or orientation of the user's face changes.

Regarding the above operation, the description has been given of the case where the user brings the user's fingertip into contact with the left eyebrow, namely, the case where the makeup simulation is aimed at the eyebrow-paint of the left eyebrow. However, makeup supporting device 100 can similarly perform the makeup simulation on other makeup types such as the eye shadow, the cheek makeup, and the lipstick.

<Effect of Second Exemplary Embodiment>

As described above, in makeup supporting device 100 of the second exemplary embodiment, the makeup of the makeup simulation target can be decided by bringing the indicator such as the fingertip into contact with the face. Therefore, with the makeup supporting device 100, it is possible to give the user the feeling of actually performing the makeup work on the face.

<Other Indicators>

The indicator of the contact determination target is not limited to the above example. For example, position acquisition unit 230 may recognize a pen point of a touch pen or a point of the makeup brush as the indicator. Position acquisition unit 230 may recognize only a specific finger such as the forefinger as the indicator.

<Other Indicator Position Acquisition Techniques>

The indicator position acquisition technique is not limited to the above example. For example, in the case where a special marker or an optical signal generator such as an LED is provided at a tip of the indicator, the position of the indicator can easily be acquired from the photographed image.

Position acquisition unit 230 may acquire the fingertip relative position from three-dimensional positions of each of the parts constituting the face and the indicator, which are obtained from a stereo image.

<Other Contact Determination Techniques>

The contact determination technique is not limited to the above example. For example, contact determination unit 240 may determine the contact by estimating a distance between the fingertip and the face from the image obtained by photographing the user's face from above. Contact determination unit 240 may receive a predetermined operation to indicate whether or not the fingertip is in contact with the face from the user, and make the contact determination based on the predetermined operation. Examples of the predetermined operation include pressing of a predetermined button, a predetermined gesture such as a raising user's thumb, and utterance.

When the fingertip (such as a tip of the forefinger) comes into contact with (presses) the face, contact determination unit 240 may use the increased width of the finger by a pressure to make the fingertip contact determination. In this case, for example, contact determination unit 240 sequentially detects the width of the fingertip based on the photographed image to acquire a change in width of the fingertip. For example, contact determination unit 240 may make the fingertip contact determination while a pressure sensor is attached to the fingertip.

<Other Makeup Deciding Techniques>

The makeup deciding technique is not limited to the above example. For example, before the fingertip comes into contact with the face, makeup decision unit 260 may receive the user's selection of the size (width) of the application region to the type, color, density, and contact position of the makeup of the makeup image generation target. Specifically, for example, makeup decision unit 260 displays a plurality of color icons like a cosmetic pallet together with the photographed image (simulation image). The color and density corresponding to the color icon selected at the last minute are used as the color and density of the makeup. Alternatively, makeup decision unit 260 may extract the skin color, a hair color, a clothes color, and the like from the photographed image, and decide the makeup having the color and density suitable to the extracted color as the makeup image generation target.

For example, makeup decision unit 260 may store a mask region having a shape previously decided in each makeup type according to the position of the facial feature points, and may generate the makeup image within the range of the mask region. Therefore, the simulation image of such the improper makeup that the lipstick runs extremely over from the lip can be prevented from being generated.

Alternatively, makeup decision unit 260 may use a shape previously decided according to the position of the facial feature points as the shape of the makeup image in each makeup type. That is, for example, makeup decision unit 260 may display the makeup image of the whole eyebrow-paint at the time the fingertip is in contact with one point near the eyebrow. Accordingly, users, such as children, who do not have the manual dexterity, can also experience the makeup feeling.

In makeup decision unit 260, for the makeup type having a pair on the right and left sides, one of the makeup images may be used as the other. In this case, desirably the other makeup application area is decided based on the facial feature points.

Alternatively, makeup decision unit 260 may decide the makeup density based on a pressure level during the contact of the indicator with the face or a user operation separately performed during the contact. In this case, for example, contact determination unit 240 acquires a level of the pressure applied to the fingertip based on the color pattern of the fingertip. Then, makeup decision unit 260 decides the higher density with increasing level of the pressure applied to the fingertip.

<Other Makeup Image Generating Techniques>

The makeup image generating technique is not limited to the above example. For example, makeup presentation unit 270 may display only the post-makeup-application image without displaying the ongoing-makeup-application image. Alternatively, makeup presentation unit 270 may perform blurring processing on a boundary portion between the skin portion and the makeup area at each contact position. Particularly, in this case, makeup presentation unit 20 may not perform the makeup image smoothing processing.

Makeup presentation unit 270 may receive an operation to erase the makeup image. In this case, for example, makeup presentation unit 270 erases an image portion in a predetermined range around the contact position of the specific indicator (such as a little finger and an end portion on an opposite side to the pen point of the touch pen) in the makeup image. Therefore, with the makeup supporting device 100, it is possible to give the user the feeling of performing wiping work in the actual makeup work.

<Modifications of Other Configurations>

The makeup table may not necessarily be stored in makeup supporting device 100. For example, in the case where makeup supporting device 100 can be connected to a network, makeup supporting device 100 may select the makeup by accessing a server, in which the makeup table is stored, on the network.

For example, makeup supporting device 100 may be such a distributed arrangement system that only photographing unit 210 and display unit 280 in the functional units illustrated in FIG. 2 may be provided in a terminal carried by the user, and other functional units are provided in a server on the network.

Moreover, makeup supporting device 100 may detect natural light, and acquire the facial feature points while an influence of the natural light is reduced from the photographed image.

Moreover, makeup supporting device 100 may acquire information on a cosmetic product necessary for the makeup from an external server, and present the information to the user together with the simulation image.

Moreover, in makeup supporting device 100, bangs, a beard, a wrinkle, and a mole, and the like may be included in the makeup of the simulation image generation target.

A makeup supporting device of the present disclosure includes: a position acquisition unit that acquires a relative position of a predetermined indicator to a face; a contact determination unit that determines whether or not the indicator is in contact with the face; a makeup decision unit that decides a way of makeup to be applied to a facial image obtained by photographing the face, based on a contact position which is the relative position when the indicator is determined to be in contact with the face; and a makeup presentation unit that generates a simulation image by superimposing a makeup image on the facial image, the makeup image indicating a state of the makeup when the decided makeup is applied.

In the makeup supporting device, the makeup decision unit may decide an application region of the makeup based on the contact position.

In the makeup supporting device, the makeup presentation unit may shape an application region of the makeup in each of makeup types.

In the makeup supporting device, the position acquisition unit may acquire a position of facial feature points of the face and a position of the indicator from the facial image, and acquire the relative position based on the acquired position of the facial feature points and the acquired position of the indicator.

In the makeup supporting device, the indicator may be a fingertip, and the contact determination unit may determine whether or not the fingertip is in contact with the face based on a change in color pattern of the fingertip.

The makeup supporting device may further include: a photographing unit that photographs the facial image; and a display unit that displays the generated simulation image.

In the makeup supporting device, the makeup decision unit may decide each of the makeup types based on the contact position.

The makeup supporting device may further include a photographing unit that photographs a video image of the face; and an image acquisition unit that acquires an image constituting the video image. At this point, the makeup presentation unit may hold a relative position of the decided application region of the makeup to the face, and the display unit may sequentially display the simulation image along the video image.

A makeup supporting method of the present disclosure includes: acquiring a relative position of a predetermined indicator to a face; determining whether or not the indicator is in contact with the face; deciding a way of makeup to be applied to a facial image obtained by photographing the face, based on a contact position which is the relative position when the indicator is determined to be in contact with the face; and generating a simulation image by superimposing a makeup image on the facial image, the makeup image indicating a state of the makeup when the decided makeup is applied.

A non-transitory computer-readable recording medium of the present disclosure stores a program for causing a device including a processor to perform pieces of processing of: acquiring a relative position of a predetermined indicator to a face; determining whether or not the indicator is in contact with the face; deciding a way of makeup to be applied to a facial image obtained by photographing the face, based on a contact position which is the relative position when the indicator is determined to be in contact with the face; and generating a simulation image by superimposing a makeup image on the facial image, the makeup image indicating a state of the makeup when the decided makeup is applied.

The present disclosure is usefully applied to a makeup supporting device, a makeup supporting method, and a makeup supporting program for being able to obtain a feeling of actually performing makeup work on a face.

What is claimed is:

1. A makeup supporting device comprising:
   a video camera that photographs a video image of the face;
   a display that display the video image of the face;
   a memory that stores instructions; and
   a processor that, when executing the instructions stored in the memory, performs operations comprising:
   receiving an image constituting the video image, the image including an image of a face and an image of a finger;
   acquiring a relative position of the finger to the face, based on the image including the image of the face and the image of the finger;
   determining whether or not the finger is in contact with the face, based on the image including the image of the face and the image of the finger;
   determining a way of makeup to be applied to the image of the face, based on a contact position, which is the relative position when the finger is determined to be in contact with the face;
   generating a simulation image by superimposing a makeup image on the image of the face, the makeup image indicating a state of the makeup when the determined makeup is applied; and
   outputting the simulation image sequentially along the video image to the display,
   wherein the processor acquires a position of facial feature points of the face and a position of the finger from the image of the face, and acquires the relative position based on the acquired position of the facial feature points and the acquired position of the finger, and
   the processor determines density for makeup based on a pressure level of the contact of the finger with the face, the pressure level being obtained by a change in color pattern of the finger.

2. The makeup supporting device according to claim 1, wherein
   the processor determines an application region of the makeup based on the contact position, and determines a range including the contract position based on the application region, the range including the contact position corresponding to a stippled makeup image.

3. The makeup supporting device according to claim 2, wherein the range including the contact position is defined by a diameter of a circular area having the contact position as a center.

4. The makeup supporting device according to claim 2, wherein the makeup image is generated in a contact period, which starts when the finger comes into contact with the face and ends when the finger is separated from the face, and the simulation image is generated by superimposing the generated makeup image on the image of the face.

5. The makeup supporting device according to claim 1, wherein
   the processor shapes an application region of the makeup in each makeup type, by smoothing an edge shape of a post-makeup-application image, and blurs the edge portion such that the color changes smoothly in the edge portion.

6. The makeup supporting device according to claim 1, wherein the display displays the generated simulation image.

7. The makeup supporting device according to claim 1, wherein
   the processor determines each of the makeup types based on the contact position.

8. A makeup supporting method comprising:
   photographing, by a video camera, a video image of a face;
   displaying, on a display, the video image of the face;
   receiving an image constituting the video image, the image including an image of a face and an image of a finger;
   acquiring a relative position of the finger to the face, based on the image including the image of the face and the image of the finger;
   determining whether or not the finger is in contact with the face, based on the image including the image of the face and the image of the finger;
   determining a way of makeup to be applied to the image of the face, based on a contact position, which is the relative position when the finger is determined to be in contact with the face;
   generating a simulation image by superimposing a makeup image on the image of the face, the makeup image indicating a state of the makeup when the determined makeup is applied; and
   outputting the simulation image sequentially along the video image to the display,
   wherein the acquiring acquires a position of facial feature points of the face and a position of the finger from the image of the face, and acquires the relative position based on the acquired position of the facial feature points and the acquired position of the finger, and
   density for makeup is determined based on a pressure level of the contact of the finger with the face, the pressure level being obtained by a change in color pattern of the finger.

9. A non-transitory computer-readable recording medium storing a program for causing a device including a processor to perform processing of:
   photographing, by a video camera, a video image of a face;
   displaying, on a display, the video image of the face;
   receiving an image constituting the video image, the image including an image of a face and an image of a finger;
   acquiring a relative position of the finger to the face, based on the image including the image of the face and the image of the finger;
   determining whether or not the finger is in contact with the face, based on the image including the image of the face and the image of the finger;
   determining a way of makeup to be applied to the image of the face, based on a contact position which is the relative position when the finger is determined to be in contact with the face;
   generating a simulation image by superimposing a makeup image on the image of the face, the makeup image indicating a state of the makeup when the determined makeup is applied; and outputting the simulation image sequentially along the video image to the display, wherein the acquiring acquires a position of facial feature points of the face and a position of the finger from the image of the face, and acquires the relative position based on the acquired position of the facial feature points and the acquired position of the finger, and density for makeup is determined based on a pressure level of the contact of the finger with the face, the pressure level being obtained by a change in color pattern of the finger.

\* \* \* \* \*